United States Patent [19]
Iyama

[11] Patent Number: 5,805,941
[45] Date of Patent: *Sep. 8, 1998

[54] CAMERA HAVING FOCUS DETECTING OPTICAL SYSTEM

[75] Inventor: Noriyuki Iyama, Hachioji, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 630,450

[22] Filed: Apr. 10, 1996

[30] Foreign Application Priority Data

Apr. 11, 1995 [JP] Japan ................................ 7-085619

[51] Int. Cl.$^6$ .............................. G01J 1/20; G03B 13/36
[52] U.S. Cl. ............................................ 396/274; 396/268
[58] Field of Search .................... 354/402, 406, 354/408, 405; 396/114, 274, 268

[56] References Cited

U.S. PATENT DOCUMENTS

| | | | |
|---|---|---|---|
| 4,593,984 | 6/1986 | Kimura et al. | 354/219 |
| 4,808,808 | 2/1989 | Karasaki et al. | 354/408 |
| 4,900,911 | 2/1990 | Matsui et al. | 354/406 |
| 4,992,819 | 2/1991 | Ohtaka et al. | 354/408 |
| 5,289,226 | 2/1994 | Goto | 354/402 |
| 5,311,004 | 5/1994 | Kusaka | 354/408 |
| 5,424,528 | 6/1995 | Goto | 354/408 |
| 5,485,239 | 1/1996 | Ohsawa | 354/402 |
| 5,498,864 | 3/1996 | Osawa | 354/408 |
| 5,526,080 | 6/1996 | Cho | 354/159 |

FOREIGN PATENT DOCUMENTS

| | | |
|---|---|---|
| 4-39638 | 2/1992 | Japan . |
| 5-16569 | 4/1993 | Japan . |
| 5-173060 | 7/1993 | Japan . |

*Primary Examiner*—Eddie C. Lee
*Assistant Examiner*—Michael Dalakis
*Attorney, Agent, or Firm*—Cushman Darby & Cushman IP Group of Pillsbury Madison & Sutro LLP

[57] ABSTRACT

A camera having a focus detecting optical system includes a quick-return mirror having the function of splitting the optical path of a light beam coming from a photographic lens into two so that one is reflected and the other is transmitted, a submirror attached to the quick-return mirror, and an imaging plane disposed at a position of an imaging surface of the photographic lens. The focus detecting optical system including a field mask, a condenser lens placed close to a preset imaging plane equivalent to the imaging plane of the photographic lens, a photoelectric converting element array, and a reimaging optical system for re-forming an image formed by the photographic lens on the photoelectric converting element array. An aspect ratio AR of the imaging plane satisfies the following condition: $0.4 < AR < 0.63$.

16 Claims, 9 Drawing Sheets

CAMERA HAVING FOCUS DETECTING OPTICAL SYSTEM

BACKGROUND OF THE INVENTION

1. Field of the Invention

This invention relates to a camera having a focus detecting optical system in which a phase correlation scheme or a contrast method is used for a range measurement.

2. Description of Related Art

In a focus detecting optical system using the so-called TTL system, it is hard to cause a shift between a position where a range measurement is intended in a photographic area and an actual range measuring position, that is, a positional shift between the visual fields of a finder and a photographic lens. Since, basically, what is measured is not an object distance, but the amount of defocus, a stable in-focus state is brought about without undergoing the influence of a change in the focal length of a photographing optical system. For these reasons, the focus detecting optical systems are used in various cameras, not to speak of single-lens reflex cameras.

For the focus detecting optical system using the TTL system, a phase correlation scheme, as it is usually called, has been frequently proposed in which after an image formed by a photographic lens is divided into two by a reimaging optical system, the two images are re-formed on a photoelectric converting element array and the positional shift between them is detected, thereby performing focus detection.

A focus detecting optical system using a technique usually called a contrast method has also been frequently proposed in which a focus position is detected from the amount of blurring of an image for focus detection.

Figure 1:
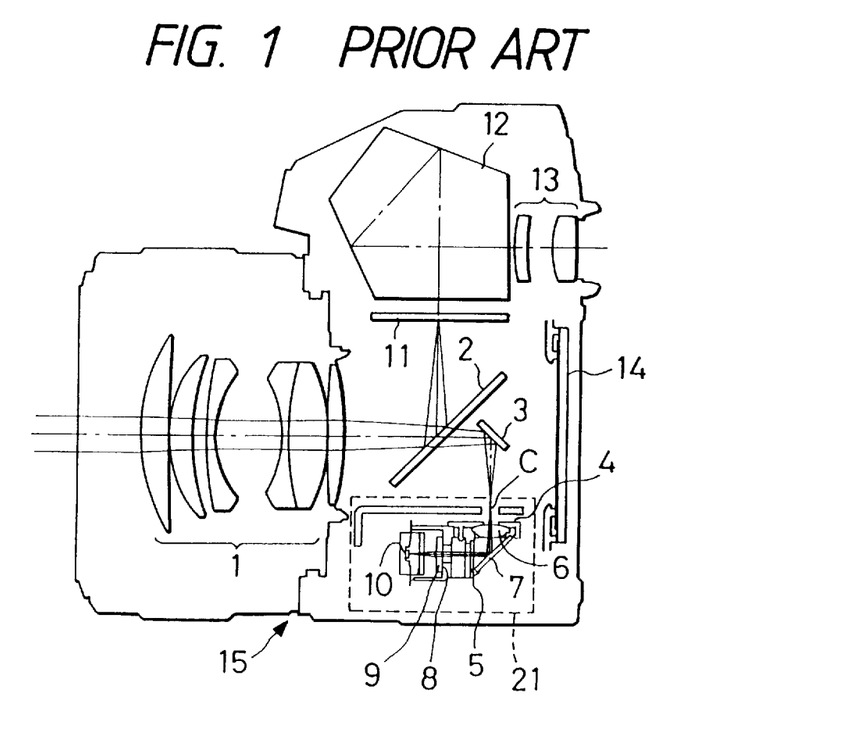
FIG. 1 is a sectional view showing an optical arrangement of a conventional camera having a focus detecting optical system.

A camera which mounts the focus-detecting optical system using the phase correlation scheme is disclosed, for example, in Japanese Utility Model Publication No. Hei 5-16569. FIG. 1 shows an optical arrangement of this camera. The camera is such that a light beam emerging from a photographic lens 1 is incident on a quick-return mirror 2 having path splitting means, by which the optical path of the light beam is split into two, so that one is introduced into a finder optical system composed of a focusing screen 11, a pentaprism 12, and an eyepiece 13 and the other is introduced into a focus detecting optical system 21 in such a way that the optical path is bent toward the lower portion of a camera body 15 by a submirror 3 attached to the quick-return mirror 2.

Figure 2:
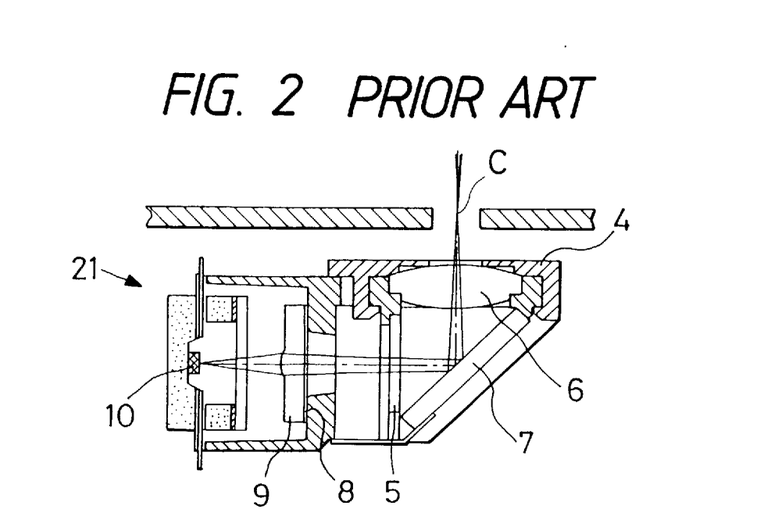
FIG. 2 is a sectional view showing the arrangement of the focus detecting optical system in FIG. 1.

The focus detecting optical system 21, as shown in FIG. 2, includes a field mask 4 for restricting the light beam entering the focus detecting optical system 21; a condenser lens 6 placed adjacent to a preset imaging plane C of the photographic lens 1; a mirror 7; an infrared cut filter 5 for eliminating detrimental infrared light; a stop mask 8 disposed behind the infrared cut filter 5, having a pair of apertures arranged with a space sufficient to hold the accuracy of focus detection; a reimaging lens 9 having a pair of lens elements; and a photoelectric converting element array 10. In this figure, however, since the stop mask 8 and the reimaging lens 9 are placed perpendicular to the plane of the figure, they appear to have one aperture and one lens element, respectively. In the focus detecting optical system 21, the shift between the relative positions of a pair of images which are formed on the photoelectric converting element array 10 by the light beam emerging from the reimaging lens 9 is detected, and the result of this detection is arithmetically processed to perform focus detection.

Figure 3:
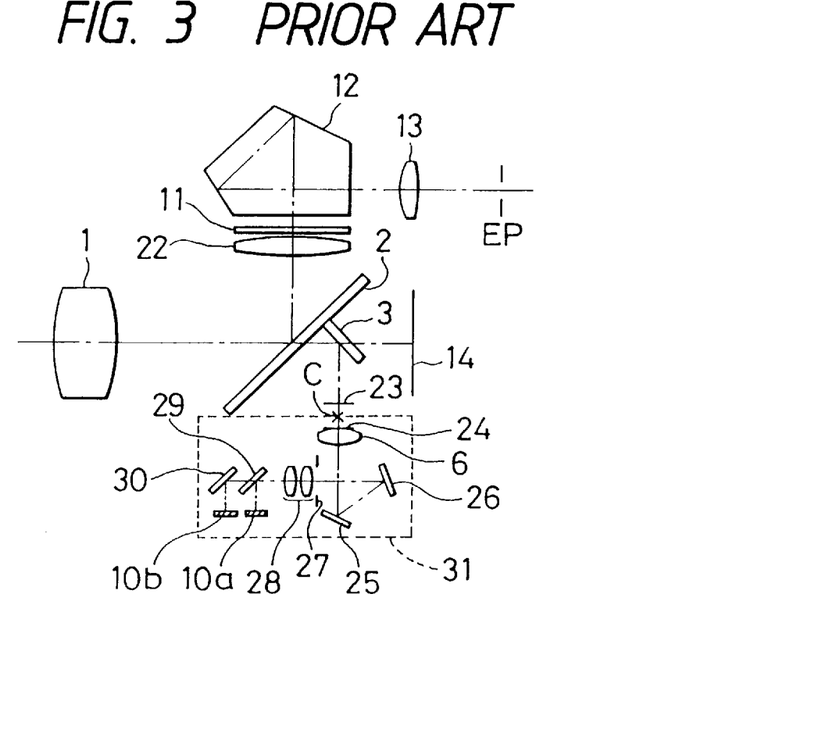
FIG. 3 is a sectional view showing an optical arrangement of another conventional camera having a focus detecting optical system.

On the other hand, a camera which mounts the focus detecting optical system using the contrast method is disclosed, for example, in Japanese Patent Preliminary Publication No. Hei 5-173060. FIG. 3 shows an optical arrangement of this camera. The camera is such that a light beam emerging from the photographic lens 1 enters the quick-return mirror 2 having path splitting means, by which the optical path is split into two, so that one is introduced into a finder optical system composed of a condenser lens 22, the focusing screen 11, the pentaprism 12, and the eyepiece 13 of an eyepiece system and the other is introduced into a focus detecting optical system 31 in such a way that the optical path is bent toward the lower portion of the camera body 15 by the submirror 3 attached to the quick-return mirror 2.

The focus detecting optical system 31 includes a field mask, not shown, for restricting the light beam incident on the focus detecting optical system 31; the condenser lens 6 disposed behind the preset imaging plane C of the photographic lens 1; mirrors 25 and 26 situated behind the condenser lens 6, an aperture stop 27 placed behind the mirror 25; a reimaging lens 28; a half mirror 29 disposed behind the reimaging lens 28; a photoelectric converting element 10a placed on the reflecting optical path of the half mirror 29; and a photoelectric converting element 10b placed on the reflecting optical path of a mirror 30. Output values from the photoelectric converting elements 10a and 10b are arithmetically processed to perform focus detection. Also, in the figure, reference numeral 23 represents a front evaluating position and 24 represents a rear evaluating position.

In the focus detecting optical system 31 mentioned above, the condenser 6 is placed adjacent to the preset imaging plane C of the photographic lens 1 so that the position of the exit pupil of the photographic lens 1 is nearly conjugate with that of the entrance pupil of the focus detecting optical system 31, and effectively introduces the light beam from the photographic lens 1 into the focus detecting optical system 31.

In the focus detecting optical system using the phase correlation scheme, it is important for the accuracy of focus detection to properly find the relative positions of a pair of images formed on the photoelectric converting element array, and thus the imaging performance of the focus detecting optical system becomes significant. A matter of importance to the imaging performance is that even though a primary image exists at any position in a region (hereinafter referred to as a range measuring field) used in the focus detecting optical system on the preset imaging plane of the photographic lens, a secondary image, that is, a pair of images on the photoelectric converting element array are formed while holding the same imaging performance. The same is said of the focus detecting optical system using the contrast method.

Next, a description is given of the position of the preset imaging plane (equivalent film surface) of the photographic lens in the camera body. Although the focus detecting optical system of the phase correlation scheme such as that shown in FIG. 1 is mainly explained here, the same explanation holds for the case of the focus detecting optical system of the contrast method.

Figure 4:
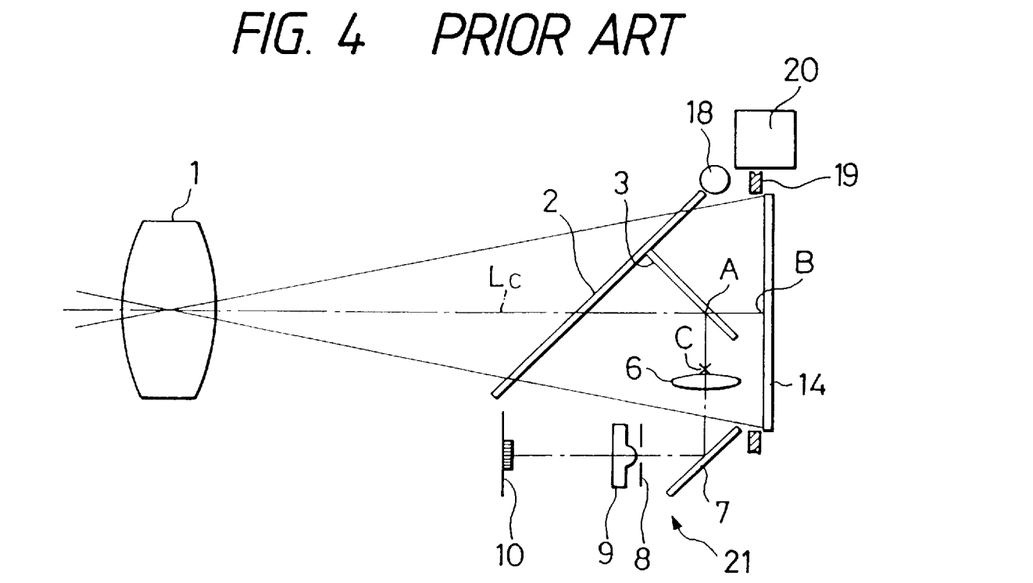
FIG. 4 is a sectional view showing the arrangement of the focus detecting optical system provided in the conventional camera and its periphery.

FIG. 4 shows the positional relationship of the quick-return mirror 2, the submirror 3, and the focus detecting optical system 21. In this figure, when a point on the submirror 3 reflecting the light beam (a ray of light on an optical axis Lc) from the photographic lens 1 is denoted by A and a point of intersection of the optical axis Lc with an imaging plane 14 is denoted by B, an arrangement is made so that a distance AB is nearly equal to a distance AC.

Subsequently, reference is made to how the distance AB is determined. When the observation of the image by the finder optical system and focus detection are carried out, the quick-return mirror 2 and the submirror 3 are situated as in FIG. 4, but when exposure takes place, they must be designed to withdraw from the optical path so that the light beam emerging from the photographic lens 1 is not prevented from entering the imaging plane 14. Hence, it is necessary to provide a rotary mechanism 18 for rotating the quick-return mirror 2 and the submirror 3 and to move them outside the optical path of the light beam leaving the photographic lens 1. Moreover, a shutter 19 and a shutter opening and closing mechanism 20 must be placed immediately before the imaging plane 14. Because the rotary mechanism 18 for the quick-return mirrors 2 and the submirror 3 and the shutter opening and closing mechanism 20 are limited in compact design, the rotating shaft of the quick-return mirror 2 cannot be located close to the imaging plane 14.

Furthermore, in order that the focus detecting optical system is compactly designed to intend the downsizing of the camera body, the focus detecting optical system is disposed in the lower portion of the camera body so that the light beam from the photographic lens 1 is reflected at a right angle by the submirror 3 and is bent toward the bottom of the camera body to be introduced into the focus detecting optical system. In this case, it is required that the condenser lens 6 and the mirror 7 are attached to the camera body so that they do not interfere with the imaging plane 14. Thus, the condenser lens 6 and the mirror 7 need be placed at some distance away from the imaging plane 14. For this reason, the distance AB is determined.

Here, if the distance AB is increased, a distance from a mount face for mounting the photographic lens 1 in the camera body to the imaging plane 14 will also be increased, and hence there is a need to elongate the back focal distance of the photographic lens 1 (the distance from the final lens surface of the photographic lens 1 to the imaging plane thereof). As a result, the optical performance of the photographic lens 1 will be degraded. In order to maintain the performance of the photographic lens 1 under the above condition, it is necessary to increase the number of lenses constituting the photographic lens 1. This causes the problem that the camera itself becomes bulky. In this way, the number of degrees of freedom of the distance AB is highly limited, and the distance AC practically depends on the distance AB.

Where the condenser lens 6 is placed at the position of the preset imaging plane C with a conventional film size (Leica size), the light beam arriving near a maximum effective area in the direction of a shorter (vertical) side of the film is blocked by the condenser lens 6, with the result that in practice, the condenser lens 6 must be placed on the optical axis lying behind the preset imaging plane C (in the direction of the photoelectric converting element array 10). This is the same as in the focus detecting optical system using the contrast method explained in reference to FIG. 3.

Thus, Japanese Patent Preliminary Publication No. Hei 4-39638 proposes a camera provided with the function of taking a picture on a particular image plane, for example, of the so-called panorama size, divided not to expose at least a part in a vertical direction of the exposure region of the film itself. This camera having the focus detecting optical system is such that in order to intend compact design of size in front-to-back and vertical directions of the camera body, the condenser lens 6 is placed at the position lower than the lower edge of the exposure region limited by the frame of the particular image plane with respect to the height of the camera and higher than the lower edge of the exposure region of the film itself, and as a result, relatively close to the preset imaging plane.

In this way, in the conventional camera having the focus detecting optical system mentioned above, the condenser lens is situated on the optical axis lying behind the preset imaging plane of the photographic lens (in the direction of the photoelectric converting element array).

Figure 5A:
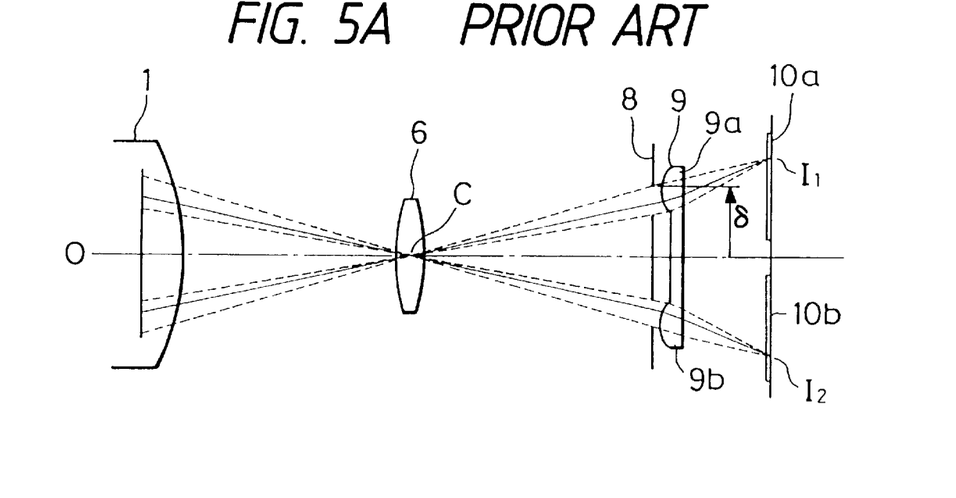
FIGS. 5A and 5B are views for explaining the arrangement of the focus detecting optical system provided in the conventional camera.
Figure 5B:
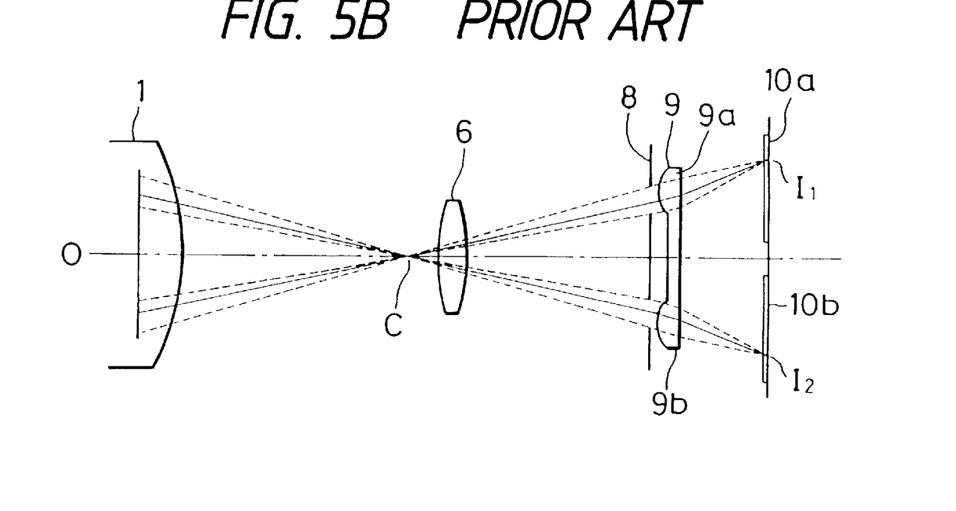
Figure 6:
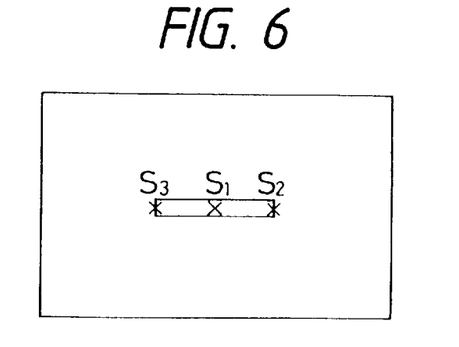
FIG. 6 is a view for explaining a state in a finder field.

Such a camera, however, has the following defects. In the conventional camera, as depicted in FIG. 5A, the condenser lens 6 forms a pair of images I1 and I2 in combination with a pair of lens elements 9a and 9b of the reimaging lens 9. The pair of lens elements 9a and 9b of the reimaging lens 9 are each spaced a shift δ away from an optical axis 0 of the condenser lens 6 to be symmetrical with respect to the optical axis 0. Thus, the influences of distortion produced symmetrically about the optical axis 0 on photoelectric converting element arrays 10a and 10b coincide between elements, closest to the optical axis 0, of the photoelectric converting element arrays 10a and 10b. Similarly, in the element arrays 10a and 10b, the second closest elements, the third closest elements, ..., or the most distant elements from the optical axis 0 are subject to an equal amount of distortion. However, in consideration of the photoelectric converting element arrays 10a and 10b from a viewpoint of focus detection, respective corresponding elements in an in-focus state are the closest element, with respect to the optical axis 0, in the array 10a and the farthest element in the array 10b; the second closest element in the array 10a and the second farthest in the array 10b; ... ; and the farthest element in the array 10a and the closest element in the array 10b. The positions of respective two corresponding elements are reversed, compared with the case where the two elements are subject to an equal amount of distortion. Hence, distortion produced on the array 10a by the condenser lens 6 and that produced on the array 10b become asymmetrical in comparison between the corresponding elements from a viewpoint of focus detection. If, as shown in FIG. 5B, the condenser lens 6 is placed on the optical axis lying behind the position of the preset imaging plane C, the ray height of the light beam used for focus detection in the condenser lens 6 will be increased and distortion produced in the condenser lens 6 becomes larger, with resulting degradation in accuracy of the focus detecting optical system. In particular, if an attempt is made to extend the range measuring field, imaging performance in the periphery of the range measuring field will be deteriorated. Here, that the range measuring field is extended means that the distance between points S2 and S3 in the finder field shown in FIG. 6 is increased.

Figure 7:
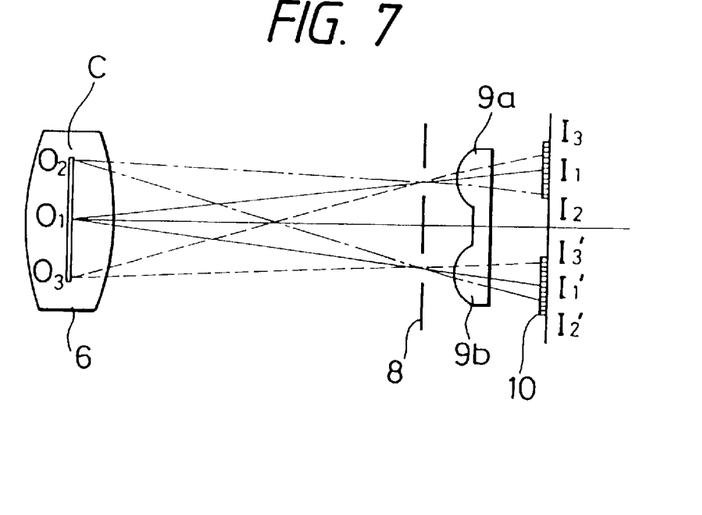
FIG. 7 is a view for explaining the effect of distortion of a condenser lens on the focus detecting optical system.

This is due to the fact that, as shown in FIG. 7, if the range measuring field is extended, off-axis range measuring positions O2 and O3 in the preset imaging plane C will be separated from the optical axis, and thus the ray height of the light beam used for focus detection in the condenser lens 6 will be increased, with the result that distortion becomes larger.

With the camera disclosed in Hei 4-39638 mentioned above, the range actually used is limited in regard to the exposure range of the film itself, and thus it cannot be conscientiously said that the film is effectively utilized. By the construction of this camera, compactness of the focus detecting optical system can be intended and the camera itself can also be made small to some extent. However, since the size of the film itself remains unchanged and a cartridge incorporating the film also remains of conventional size, there is a limit to compact design of the entire camera.

Moreover, where a photograph is taken on the film thus exposed, for example, with Leica size (aspect ratio AR÷0.67) or high vision size (aspect ratio AR÷0.55), except for panorama size, only the center portion in the lateral direction of the exposed film is used, and hence it is required that when printing is made on printing paper from the film, the enlargement of the photograph is set at a high magnification. As such, it becomes difficult to obtain photographs of high image quality. Also, the aspect ratio AR is a value satisfying $$AR = X/Y \tag{1}$$

where X is a maximum effective area in the direction of a shorter (vertical) side of the imaging plane and Y is a maximum effective area in the direction of a longer (lateral) side of the imaging plane.

SUMMARY OF THE INVENTION

It is, therefore, an object of the present invention to provide a camera having a focus detecting optical system which is capable of making focus detection with high accuracy and is compactly constructed.

In order to achieve this object, the camera according to the present invention includes a quick-return mirror having the function of splitting the optical path of a light beam from a photographic lens into two, one reflected and the other transmitted; a submirror attached to the quick-return mirror; an imaging plane disposed at the imaging surface of the photographic lens; and a focus detecting optical system composed of a field mask, a condenser lens placed close to a preset imaging plane equivalent to the imaging plane of the photographic lens, a photoelectric converting element array, and a reimaging optical system for re-forming an image formed by the photographic lens on the photoelectric converting element array. The aspect ratio AR of the imaging plane satisfies the following condition:

$$0.4 < AR < 0.63 \tag{2}$$

Further, in the camera of the present invention, the field mask and the condenser lens are placed so that the preset imaging plane is situated between them.

Still further, the condenser lens may be placed at the position of the preset imaging plane.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, it will be expedient to explain the function of the camera having the focus detecting optical system according to the present invention.

Figure 8:
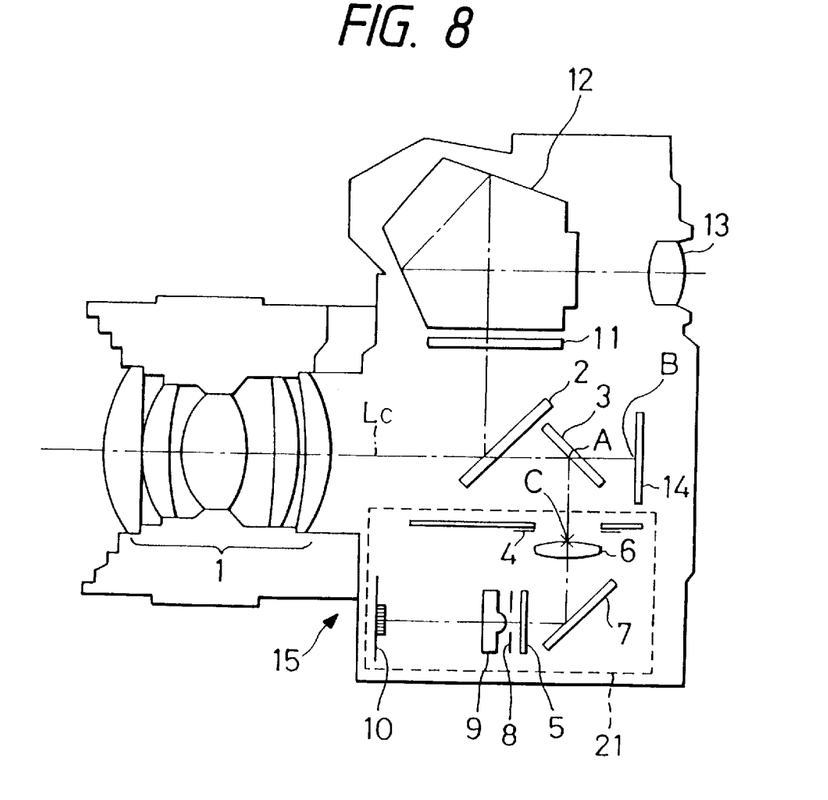
FIG. 8 is a sectional view showing an optical arrangement of a camera having a focus detecting optical system of a first embodiment according to the present invention.

The camera having the focus detecting optical system of the present invention, as illustrated in FIG. 8, is constructed with the quick-return mirror 2 for splitting the optical path of a light beam emerging from the photographic lens 1 into two, one reflected and the other transmitted; the submirror 3 attached to the quick-return mirror 2; the imaging plane 14 placed at the imaging surface of the photographic lens 1; and the focus detecting optical system 21 composed of the field mask 4, the condenser lens 6 disposed close to the preset imaging plane C of the photographic lens 1, the mirror 7, the photoelectric converting element array 10, and the reimaging lens 9 for re-forming an image formed by the photographic lens 1 on the photoelectric converting element array 10. The aspect ratio AR is defined to satisfy Eq. (2).

In Eq. (2), if the aspect ratio AR is below the lower limit of this equation, the maximum effective area in the direction of the shorter side of the imaging plane 14 becomes excessively small over that in the direction of the longer side of the imaging plane 14, and an imaging plane with lateral length which is greatly extended will be obtained. Hence, in the case of a 35 mm format film, for instance, it is difficult to maintain good image quality in printing ranging from panorama size to Leica size and there are problems in practical use. On the other hand, if the aspect ratio AR exceeds the upper limit of Eq. (2), the light beam reaching the maximum effective area in the direction of the shorter side of the imaging plane 14 will be extremely separated from the optical axis, and it becomes difficult to place the condenser lens 6 close to the preset imaging plane C. Consequently, the accuracy of focus detection cannot be favorably maintained.

Thus, if the camera is designed to satisfy Eq. (2), the light beam reaching the periphery of the maximum effective area in the direction of the shorter side of the imaging plane 14 will approach the optical axis. Specifically, since the light beam from the photographic lens 1 can be made to pass above the position of the preset imaging plane C in the camera body 15, it becomes easy to place the condenser lens 6 in the vicinity of the preset imaging plane C. In this way, distortion yielded in the condenser lens 6 is effectively suppressed, and the accuracy of focus detection can be improved. Furthermore, the placement of the condenser lens 6 in the vicinity of the preset imaging plane C minimizes an adverse effect of a change of the refracting power of the condenser lens 6 by temperature and humidity on the accuracy of focus detection. Thus, good accuracy of focus detection can be held.

Where the imaging plane 14 is constructed with a film, the film size can be minimized and thus the cartridge itself containing the film can also be made small. As such, the camera body 15 itself can be made smaller, and a very compact camera can be provided although it has the focus detecting optical system.

With the camera using the 35 mm format film, the accuracy of the focus detecting optical system largely depends upon magnification where a photograph is enlarged on the printing paper from the film. If there is a considerable difference in aspect ratio between the film and the printing paper, the photograph will be enlarged on the printing paper in such a way that both ends of the film in a vertical or lateral direction in the exposure range of the film are not used. Hence, the extent of actual enlargement and printing is reduced in the maximum effective area of the film and as a result, it is necessary to increase the enlarging magnification.

Thus, in order to maintain good image quality in printing ranging from panorama size to Leica size, it is more desirable that the aspect ratio AR satisfies the following condition:

$$0.48 < AR < 0.59 \quad (3)$$

In Eq. (3), if the value of the aspect ratio AR is less than the lower limit of this equation, it becomes difficult to maintain good image quality on the printing paper because the enlarging magnification of Leica size increases. If, on the other hand, the aspect ratio AR exceeds the upper limit of Eq. (3), it also becomes difficult to maintain good image quality on the printing paper because the enlarging magnification of panorama size increases.

In order to obviate the above defect under the condition that Eq. (3) is not satisfied, it is necessary to improve the accuracy of focus detection in either case, and the compatibility of this improvement with other factors (for example, the extension of the range measuring field and a good assembly of the camera body) becomes very difficult. This has no practical use.

Further, in the camera of the present invention, it is favorable that the field mask 4 and the condenser lens 6 are placed so that the preset imaging plane C is interposed between them. Since this arrangement allows the condenser lens 6 to approach the preset imaging plane C, it is possible to decrease the ray height of the light beam used for the focus detecting optical system in the condenser lens 6. Thus, distortion yielded in the condenser lens 6 can be suppressed and the accuracy of focus detection is improved. In particular, when the range measuring field is extended, a marked effect is secured. The placement of the condenser lens 6 at the position of the preset imaging plane C is effective because the ray height is further decreased.

Still further, the camera of the present invention may be designed so that the field mask 4 is located at the position of the preset imaging plane C and the condenser lens 6 is disposed on the optical axis lying behind the preset imaging plane C (on the side of the focus detecting optical system 21). With this arrangement, detrimental rays are prevented by the field mask 4 from entering the focus detecting optical system 21 and the production of flare light can be suppressed. Consequently, the production of an optical noise on the photoelectric converting element array 10 is prevented, and focus detection can be performed with a high degree of accuracy.

Still further, in the camera of the present invention, it is desirable that the infrared cut filter 5 for eliminating infrared radiation of rays incident on the photoelectric converting element array 10 is located at the position closer to the photoelectric converting element array 10 than the condenser lens 6. This arrangement can bring the condenser lens 6 closer to the preset imaging plane C than the case where the infrared cut filter 5 is placed between the preset imaging plane C and the condenser lens 6.

The focus detecting optical system 21 further includes the reimaging lens 9 having a pair of lens elements arranged perpendicular to the plane of the figure in FIG. 8 and the stop mask 8 having a pair of apertures arranged with a space sufficient to secure the accuracy of focus detection, placed in the vicinity of the reimaging lens 9. In this case, it is desirable that the condenser lens 6 is constructed of material devoid of electrifying properties, such as acrylic resin, and the reimaging lens 9 is made of material having a small hygroscopic expansion coefficient, such as polycarbonate resin or polyolefin resin, and acquiring a property that it is scarcely subject to a change by humidity. In particular, if the infrared cut filter 5 is situated closer to the stop mask 8 on the side of the photoelectric converting element array 10 than the condenser lens 6, dust particles in the mirror box of the camera body 15 may adhere to the condenser lens 6, but the accuracy of focus detection will not suffer deterioration attributable to the adherence of foreign matter like dust, because the condenser lens 6 is made of material devoid of electrifying properties as mentioned above. Further, since the reimaging lens 9 having a great effect on the accuracy of the focus detecting optical system 21 by a change of the refractive index of the lens itself is constructed of material having the property such that it is scarcely subject to a change by humidity as described above, the focus detecting optical system 21 in which the accuracy of focus detection is little degraded by the change of humidity can be provided.

Alternatively, an antistatic surface treatment may be applied to the surface, directed toward the submirror 3, of the condenser lens 6 to prevent the adherence of dust. In the camera of the present invention, the focus detecting optical system is designed so that the range measuring field, as shown in FIG. 6, is laterally extended. This design does away with the need for increasing the length of the submirror 3 perpendicular to the quick-return mirror 2 and enables an effective extension of the range measuring field.

The focus detecting optical system mounted in the camera of the present invention has an excellent effect not only on focus detection according to the phase correlation scheme, but also on the method of introducing part of the light beam from the photographic lens into the focus detecting optical system to perform focus detection through its output information.

Referring to the embodiments shown in the drawings, the present invention will be explained in detail below.

FIRST EMBODIMENT

The camera of this embodiment, as shown in FIG. 8, is constructed with the quick-return mirror 2 for splitting the light beam emerging from the photographic lens 1 into two, one reflected toward the finder optical system and the other transmitted; the submirror 3 attached to the quick-return mirror 2, for introducing the other beam into the focus detecting optical system 21 placed in the lower portion of the camera body 15; and the imaging plane 14 disposed at the position of the imaging surface of the photographic lens 1. The finder optical system includes the focusing screen 11, the pentaprism 12, and the eye-piece 13. The focus detecting optical system 21, on the other hand, includes the field mask 4 located at the position of the preset imaging plane C of the photographic lens 1 in order to restrict the light beam incident on the focus detecting optical system 21; the condenser lens 6 placed adjacent to the preset imaging plane C; the mirror 7; the stop mask 8 having a pair of apertures arranged perpendicular to the plane of the figure, behind the condenser lens 6; the reimaging lens 9 having a pair of lens elements arranged with a space sufficient to secure the accuracy of focus detection, perpendicular to the plane of the figure and adjacent to the stop mask 8; and the photoelectric converting element array 10.

Also, in the camera of the first embodiment, the condenser lens 6 is located at the position of the preset imaging plane C, and the infrared cut filter 5 is placed immediately before the stop mask 8.

Figure 9:
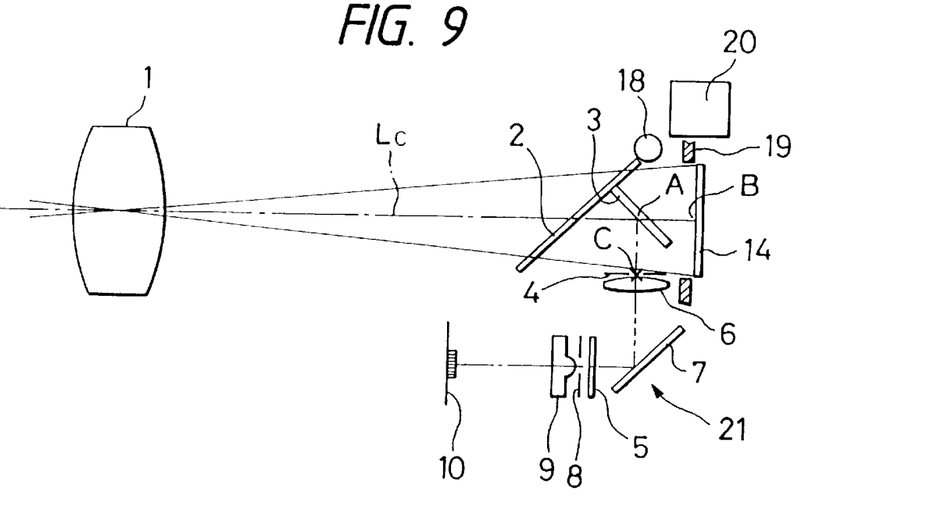
FIG. 9 is a sectional view showing the arrangement of the focus detecting optical system provided in the camera of the first embodiment and its periphery.

FIG. 9 illustrates the arrangement of the focus detecting optical system 21 in the camera of the first embodiment, including its periphery. It is clearly seen from this figure that the camera of the first embodiment, over the conventional camera shown in FIG. 4, is such that the quick-return mirror 2, the submirror 3, and the imaging plane 14 are made smaller and compactness of the camera body 15 itself is attained.

Since the camera of the first embodiment is constructed as mentioned above, the light beam emerging from the photographic lens 1 is incident on the quick-return mirror 2, where the optical path of the light beam is split into two, so that one is introduced into the finder optical system composed of the focusing screen 11, the pentaprism 12, and eyepiece 13, and the other is bent toward the lower portion of the camera body 15 by the submirror 3 attached to the quick-return mirror 2 and is conducted to the focus detecting optical system 21. In this way, focus detection is performed in accordance with the shift between the relative positions of a pair of images formed on the photoelectric converting element array 10 by the light beam emerging from the reimaging lens 9.

The numerical data of optical members, such as lenses, constituting the camera having the focus detecting optical system in the first embodiment is shown below.

| | |
|---|---|
| Magnification of focus detecting optical system 21 | −0.37x |
| Amount of decentering of field mask 4 | 0.6319 |
| Amount of decentering of reimaging lens 9 | 0.6827 |

$r_1$ (preset imaging plane C) = ∞
  $d_1 = 0$
$r_2$ (field mask 4) = ∞
  $d_2 = 0$
$r_3$ (condenser lens 6) = 10.0633
  $d_3 = 3.1203$   $n_3 = 1.52540$   $v_3 = 56.25$
$r_4$ (condenser lens 6) = −18.7739
  $d_4 = 13.0532$
$r_5$ (infrared cut filter 5) = ∞
  $d_5 = 0.5000$   $n_5 = 1.51633$   $v_5 = 64.15$
$r_6$ (infrared cut filter 5) = ∞
  $d_6 = 0.3400$
$r_7$ (stop mask 8) = ∞
  $d_7 = 0.0600$
$r_8$ (reimaging lens 9) = 2.1697
  $d_8 = 2.9477$   $n_8 = 1.52540$   $v_8 = 56.25$
$r_9$ (reimaging lens 9) = ∞
  $d_9 = 3.1789$
$r_{10}$ (glass cover, not shown) = ∞
  $d_{10} = 0.7000$   $n_{10} = 1.56600$   $v_{10} = 64.15$
$r_{11}$ (glass cover, not shown) = ∞
  $d_{11} = 0$
$r_{12}$ (photoelectric converting element array 10) = ∞

Figure 10:
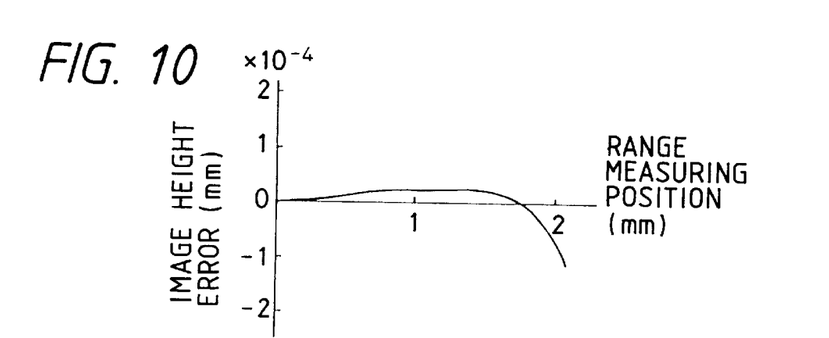
FIG. 10 is a graph showing image height errors produced in the camera of the first embodiment.
Figure 11:
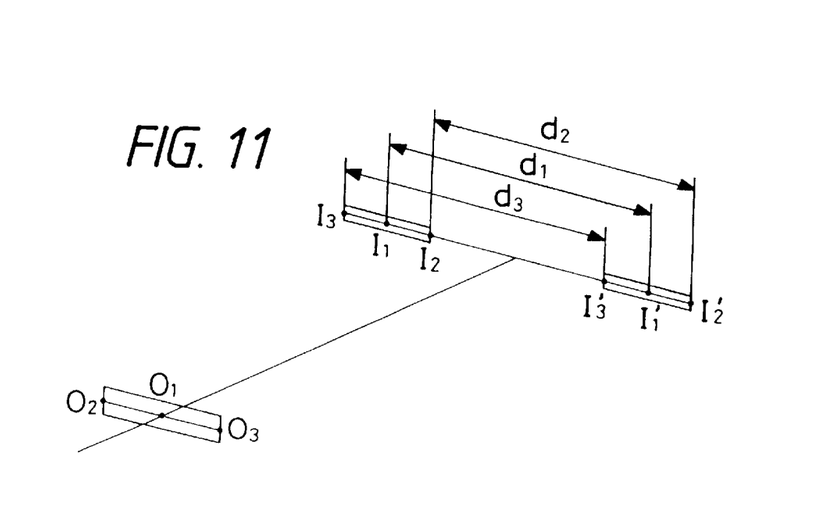
FIG. 11 is a view for explaining the image height errors.

FIG. 10 is a graph plotting image height errors in the camera of the first embodiment. In the range measuring field shown in FIG. 11 (in which the condenser lens 6, the stop mask 8, and the reimaging lens 9 are omitted), two images of an object point O1 formed on the photoelectric converting element array 10 are designated by I1 and I1', two images of an object point O2 formed on the photoelectric converting element array 10 are designated by I2 and I2', and two images of an object point O3 formed on the photoelectric converting element array 10 are designated by I3 and I3'. In this case, the image height errors mean the difference between a distance d1 from the image I1 to the image I1' and a distance d2 from the image I2 to the image I2' and the difference between the distance d1 and a distance d3 from the image I3 to the image I3' where the distance d1 is taken as a reference. That the accuracy of the focus detecting optical system 21 is good means that the image height errors are slight, that is, the differences between the distance d1 and the distance d2 and between the distance d1 and the distance d3 are small. In this way, the differences found with respect to the positions of the object points in the entire range measuring field are plotted in the graph of FIG. 10. In this figure, the abscissas of the graph are distances of range measuring positions from the optical axis in the range measuring field. Also, in this case, the range measuring position is shown only on one side of the optical axis (the distance between the object points O1 and O2 in FIG. 11). The ordinates of the graph in FIG. 10 are the distances between the distance d1 from the image I1 to the image I1' of the axial object point O1 and the distance d2 from the image I2 to the image I2' of the off-axis object point, for example, O2.

Figure 12:
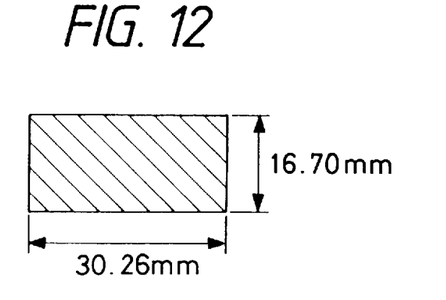
FIG. 12 is a view showing the shape of the effective area of an imaging plane in the camera of the first embodiment.

In the camera of the first embodiment, the maximum effective areas of the imaging plane 14 are as indicated below. The profile of the effective area of the imaging plane 14 is illustrated in FIG. 12.

| | |
|---|---|
| Shorter (vertical) side of the imaging plane 44 | 16.70 mm |
| Longer (lateral) side of the imaging plane 14 | 30.26 mm |
| Aspect ratio AR | 0.552 |

The camera of the first embodiment, in FIG. 8, is defined so that the distance AB is 9.38 mm and the distance AC is 9.78 mm. Here, the difference between the distances AB and AC is due to the correction of the shift between optical path lengths caused by the fact that when focus detection is performed, the light beam reaching the focus detecting optical system 21 is transmitted through the quick-return mirror 2, but in the case of exposure, the light beam is not transmitted therethrough.

Further, in the camera of the first embodiment, the condenser lens 6, because of its spherical shape, is excellent in workability and assembly and is advantageous to cost, compared with the case of an aspherical shape. Also, in order to hold the condenser lens 6, the field mask 4 may be placed behind the condenser lens 6.

SECOND EMBODIMENT

Figure 13:
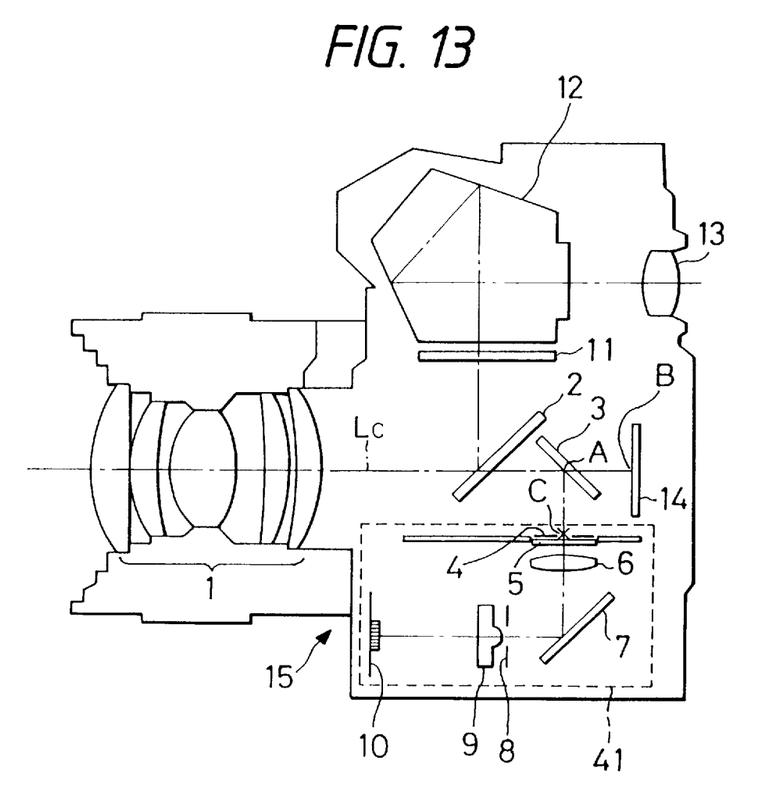
FIG. 13 is a sectional view showing an optical arrangement of a camera having a focus detecting optical system of a second embodiment according to the present invention.

In the camera of this embodiment, as shown in FIG. 13, a focus detecting optical system 41 is designed so that the field mask 4 and the infrared cut filter 5 are arranged at the position of the preset imaging plane C and the condenser lens 6 is placed behind the preset imaging plane C. This arrangement makes it possible to eliminate detrimental light incident on the focus detecting optical system 41. Hence, the influence of flare light is lessened and focus detection can be performed with high accuracy. In the second embodiment, since the condenser lens 6, although it lies at some distance away from the preset imaging plane C, is relatively close to the preset imaging plane C, distortion attributable to the condenser lens 6 is minimized and the focus detecting optical system which is high in accuracy can be constructed.

Figure 14:
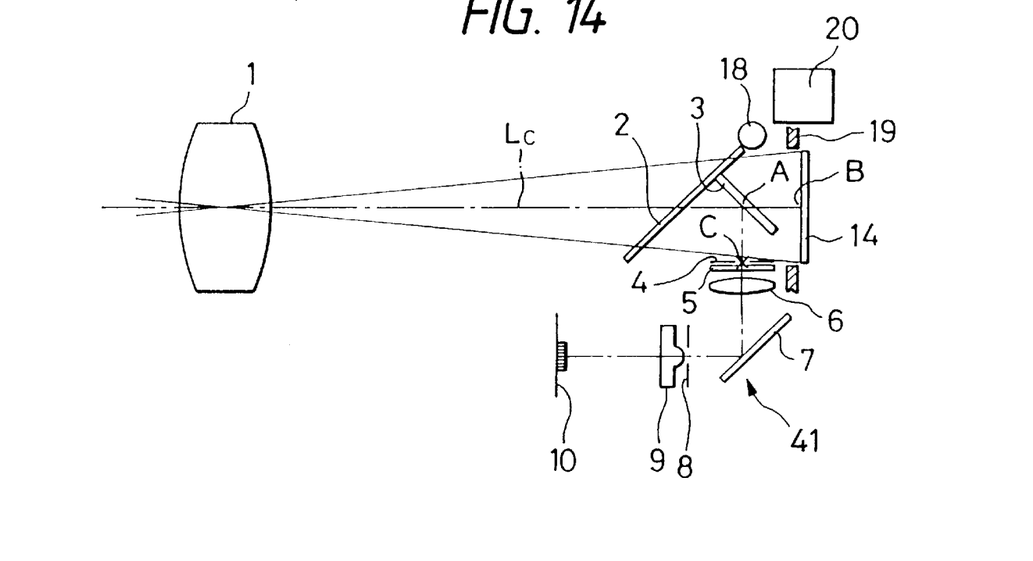
FIG. 14 is a sectional view showing the arrangement of the focus detecting optical system provided in the camera of the second embodiment and its periphery.

The arrangement except for the above description is the same as in the first embodiment. FIG. 14 shows the arrangement of the focus detecting optical system 41 in the camera of the second embodiment, including its periphery.

The numerical data of optical members, such as lenses, constituting the camera having the focus detecting optical system in the second embodiment is shown below.

| | | |
|---|---|---|
| Magnification of focus detecting optical system 41 | −0.37x | |
| Amount of decentering of field mask 4 | 0.6137 | |
| Amount of decentering of reimaging lens 9 | 0.6908 | |
| $r_1$ (preset imaging plane C) = ∞ | | |
| $d_1 = 9$ | | |
| $r_2$ (field mask 4) | | |
| $d_2 = 0$ | | |
| $r_3$ (infrared cut filter 5) = ∞ | | |
| $d_3 = 0.5000$ | $n_3 = 1.51633$ | $v_3 = 64.15$ |
| $r_4$ (infrared cut filter 5) = ∞ | | |
| $d_4 = 0.4000$ | | |
| $r_5$ (condenser lens 6) = 8.7758 | | |
| $d_5 = 3.0573$ | $n_5 = 1.52540$ | $v_5 = 56.25$ |
| $r_5$ (condenser lens 6) = −24.5571 | | |
| $d_5 = 13.2348$ | | |
| $r_7$ (stop mask 8) = ∞ | | |
| $d_7 = 0.0600$ | | |
| $r_8$ (reimaging lens 9) = 2.1327 | | |
| $d_3 = 2.8926$ | $n_8 = 1.52540$ | $v_8 = 56.25$ |
| $r_9$ (reimaging lens 9) = ∞ | | |
| $d_9 = 3.0554$ | | |
| $r_{10}$ (glass cover, not shown) = ∞ | | |
| $d_{10} = 0.7000$ | $n_{10} = 1.56600$ | $v_{10} = 64.15$ |
| $r_{11}$ (glass cover, not shown) = ∞ | | |
| $d_{11} = 0$ | | |
| $r_{12}$ (photoelectric converting element array 10) = ∞ | | |

Figure 15:
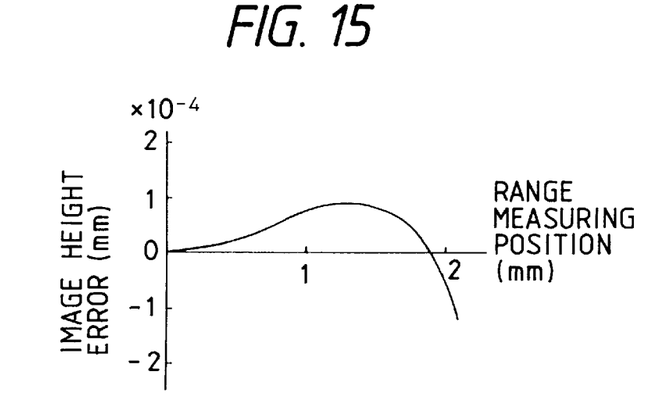
FIG. 15 is a graph showing image height errors produced in the camera of the second embodiment.

FIG. 15 is a graph plotting image height errors in the camera of the second embodiment.

Figure 16:
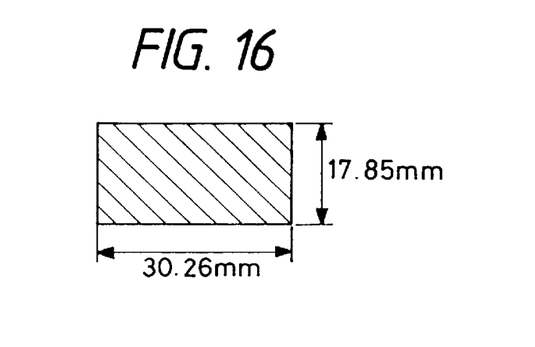
FIG. 16 is a view showing the shape of the effective area of the imaging plane in the camera of the second embodiment.

In the camera of the second embodiment, the maximum effective areas of the imaging plane 14 are as indicated below. The profile of the effective area of the imaging plane 14 is illustrated in FIG. 16.

| | |
|---|---|
| Shorter (vertical) side of the imaging plane 14 | 17.85 mm |
| Longer (lateral) side of the imaging plane 14 | 30.26 mm |
| Aspect ratio AR | 0.590 |

The camera of the second embodiment is defined so that the distance AB is 9.38 mm and the distance AC is 9.78 mm.

THIRD EMBODIMENT

Figure 17:
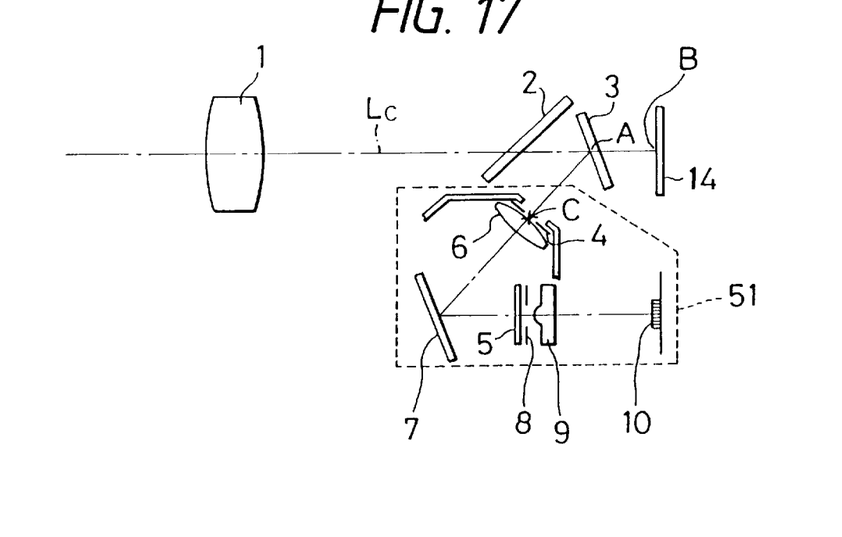
FIG. 17 is a sectional view showing the arrangement of the focus detecting optical system provided in the camera of a third embodiment and its periphery.

FIG. 17 shows the arrangement of a focus detecting optical system 51 in the camera of this embodiment and its periphery. In the third embodiment, the photoelectric converting element array 10 constituting the focus detecting optical system 51 is placed in the rear of the camera body, and the optical path for introducing the light beam from the photographic lens 1 into the photoelectric converting element array 10 is formed in such a way that the optical path is bent toward the front of the camera (on the side of the photographic lens 1) by the submirror 3 and is further bent toward the rear of the camera by the mirror 7 to arrive at the photoelectric converting element array 10. By this arrangement, the number of degrees of freedom of the placement of the focus detecting optical system 51, notably the photoelectric converting element array 10, is increased.

Also, the arrangement except for the above description, the numerical data of optical members, such as lenses, constituting the camera, and the image height error in the third embodiment are the same as those shown in the first embodiment, and thus the corresponding figure, data, and graph are omitted.

Figure 18:
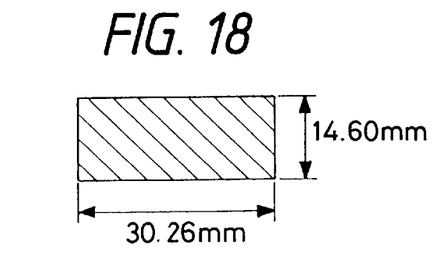
FIG. 18 is a view showing the shape of the effective area of the imaging plane in the camera of the third embodiment.

In the camera of the third embodiment, the maximum effective areas of the imaging plane 14 are as indicated below. The profile of the effective area of the imaging plane 14 is illustrated in FIG. 18.

| | |
|---|---|
| Shorter (vertical) side of the imaging plane 14 | 14.60 mm |
| Longer (lateral) side of the imaging plane 14 | 30.26 mm |
| Aspect ratio AR | 0.482 |

The camera of the third embodiment is defined so that the distance AB is 9.38 mm and the distance AC is 9.78 mm.

FOURTH EMBODIMENT

Figure 19:
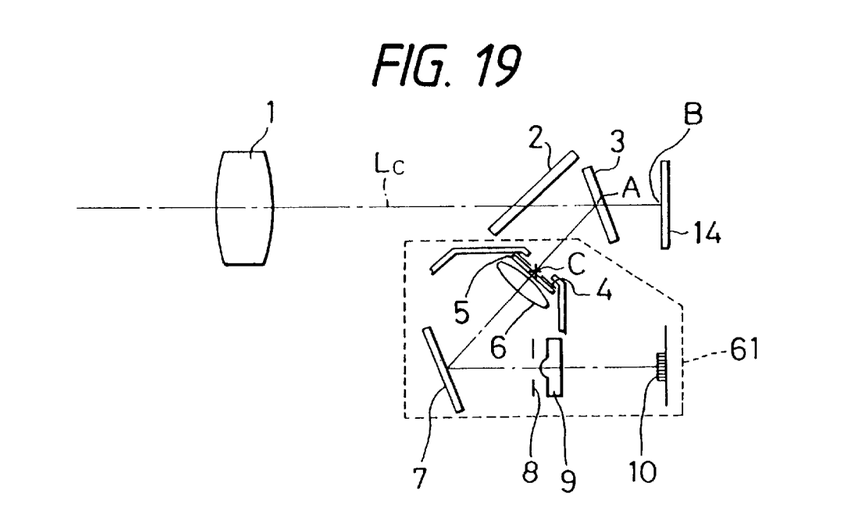
FIG. 19 is a sectional view showing the arrangement of the focus detecting optical system provided in the camera of a fourth embodiment and its periphery.

FIG. 19 shows the arrangement of a focus detecting optical system 61 of the camera in this embodiment and its periphery. In the fourth embodiment, the photoelectric converting element array 10 constituting the focus detecting optical system 61 is placed in the rear of the camera body, and the optical path for introducing the light beam from the photographic lens 1 into the photoelectric converting element array 10, as in the camera of the third embodiment, is formed in such a way that the optical path is bent toward the front of the camera (on the side of the photographic lens 1) by the submirror 3 and is further bent toward the rear of the camera by the mirror 7 to arrive at the photoelectric converting element array 10. The field mask 4 and the infrared cut filter 5, as in the camera of the second embodiment, are arranged at the position of the preset imaging plane C. Consequently, the camera of the fourth embodiment has the effect combining the second embodiment with the third embodiment.

The arrangement other than the above description, the numerical data of optical members, such as lenses, constituting the camera, and the image height error in the fourth embodiment are the same as those shown in the second embodiment, and thus the corresponding figure, data, and graph are omitted.

In the camera of the fourth embodiment, the maximum effective areas of the imaging plane 14 are as indicated below. The profile of the effective area of the imaging plane 14 is the same as in FIG. 18.

| | |
|---|---|
| Shorter (vertical) side of the imaging plane 14 | 14.60 mm |
| Longer (lateral) side of the imaging plane 14 | 30.26 mm |
| Aspect ratio AR | 0.482 |

The camera of the third embodiment is such that the distance AB is 9.38 mm and the distance AC is 9.78 mm.

FIFTH EMBODIMENT

Figure 20:
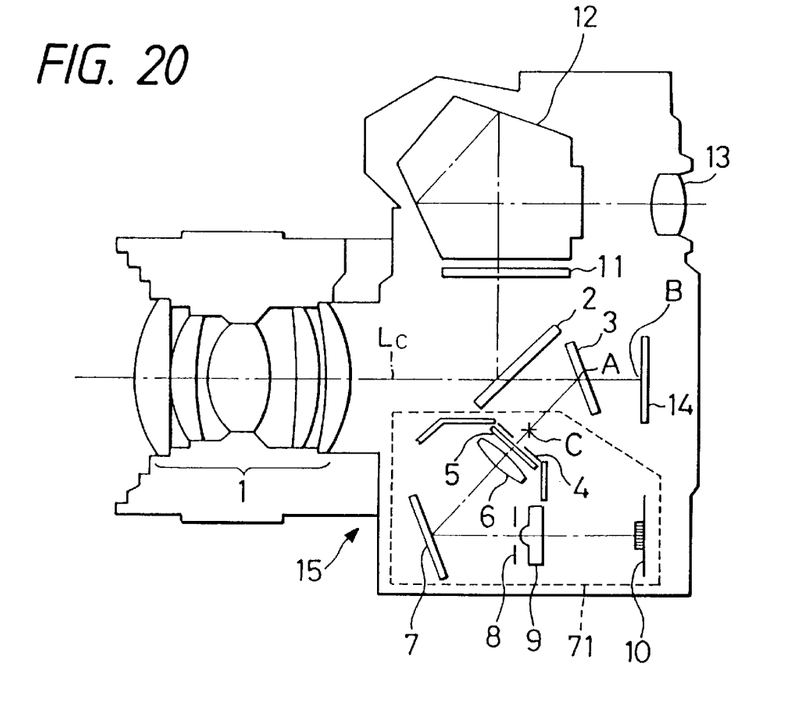
FIG. 20 is a sectional view showing an optical arrangement of a camera having a focus detecting optical system of a fifth embodiment according to the present invention.

In the camera of this embodiment, as shown in FIG. 20, a focus detecting optical system 71 is constructed so that the field mask 4 is located at the position separated from the preset imaging plane C. The arrangement other than this is identical with that of the camera shown in the fourth embodiment.

The numerical data of optical members, such as lenses, constituting the camera having the focus detecting optical system in the fifth embodiment is shown below.

| | | | |
|---|---|---|---|
| Magnification of focus detecting Optical system 71 | −0.37x | | |
| Amount of decentering of field mask 4 | 0.6021 | | |
| Amount of decentering of reimaging lens 9 | 0.7372 | | |
| $r_1$ (preset imaging plane C) = ∞ | | | |
| $d_1 = 0$ | | | |
| $r_2$ (field mask 4) = ∞ | | | |
| $d_2 = 2.9800$ | | | |
| $r_3$ (infrared cut filter 5) = ∞ | | | |
| $d_3 = 0.5000$ | $n_3 = 1.51663$ | $v_3 = 64.15$ | |
| $r_4$ (infrared cut filter 5) = ∞ | | | |
| $d_4 = 0.3400$ | | | |
| $r_5$ (condenser lens 6) = 9.1886 | | | |
| $d_5 = 3.3618$ | $n_5 = 1.52540$ | $v_5 = 56.25$ | |
| $r_6$ (condenser lens 6) = −22.5529 | | | |
| $d_5 = 13.3142$ | | | |
| $r_7$ (stop mask 8) = ∞ | | | |
| $d_7 = 0.0600$ | | | |
| $r_8$ (reimaging lens 9) = 2.2300 | | | |
| $d_8 = 2.8199$ | $n_8 = 1.52540$ | $v_8 = 56.25$ | |
| $r_9$ (reimaging lens 9) = ∞ | | | |
| $d_9 = 2.9898$ | | | |
| $r_{10}$ (glass cover, not shown) = ∞ | | | |
| $d_{10} = 0.7000$ | $n_{10} = 1.56600$ | $v_{10}\ 64.15$ | |
| $r_{11}$ (glass cover, not shown) = ∞ | | | |
| $d_{11} = 0$ | | | |
| $r_{12}$ (photoelectric converting element array 10) = ∞ | | | |

Figure 21:
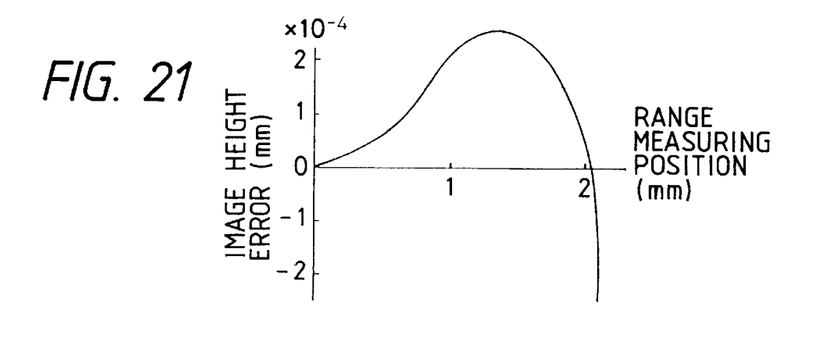
FIG. 21 is a graph showing image height errors produced in the camera of the fifth embodiment.

FIG. 21 is a graph plotting image height errors in the camera of the fifth embodiment.

In the camera of the fifth embodiment, the maximum effective areas of the imaging plane 14 are as indicated below. The profile of the effective area of the imaging plane 14 is the same as that of the first embodiment shown in FIG. 12.

| | |
|---|---|
| Shorter (vertical) side of the imaging plane 14 | 16.70 mm |
| Longer (lateral) side of the imaging plane 14 | 30.26 mm |
| Aspect ratio AR | 0.552 |

The camera of the fifth embodiment is such that the distance AB is 9.38 mm and the distance AC is 9.78 mm.

Also, in the camera of the fifth embodiment, the image height error, as shown In FIG. 21, is deteriorated compared with that of the camera of the first embodiment, but if the condenser lens is shaped into an aspherical form, the image height error will be improved and the accuracy of focus detection can be enhanced.

SIXTH EMBODIMENT

The camera having the focus detecting optical system in this embodiment has the same construction as the camera of the first embodiment shown in FIG. 8 with the exception that the condenser lens 6 is made of acrylic resin which is devoid of electrifying properties and to which dust particles do not easily adhere, and the reimaging lens 9 is made of polyolefin resin having a small hygroscopic expansion coefficient. Thus, the corresponding figure is omitted.

Hence, in addition to the effect of the camera of the first embodiment, the camera of the sixth embodiment can obviate the defect that dust particles adhere to the condenser lens 6 to degrade the accuracy of focus detection. Furthermore, since the reimaging lens 9 having a great effect on the accuracy of focus detection is constructed of polyolefin resin in which a physical change of material by humidity is slight, the degradation of the accuracy of focus detection caused by a humidity change can be obviated.

Additionally, if the condenser lens 6 is constructed of the material in which the electrifying properties are poor compared with the reimaging lens 9, and the reimaging lens 9 is constructed of the material in which the hygroscopic expansion coefficient is small compared with the condenser lens 6, a further improvement of the accuracy of focus detection can be intended.

The numerical data of optical members, such as lenses, constituting the camera having the focus detecting optical system in the sixth embodiment is shown below.

| | | | |
|---|---|---|---|
| Magnification of focus detecting optical system | −0.37x | | |
| Amount of decentering of field mask | 0.6065 | | |
| Amount of decentering of reimaging lens | 0.7087 | | |
| $r_1$ (preset imaging plane) = ∞ | | | |
| $d_1 = 0.0001$ | | | |
| $r_2$ (field mask) = ∞ | | | |
| $d_2 = 0.1000$ | | | |
| $r_3$ (condenser lens) = 9.5280 | | | |
| $d_3 = 3.1116$ | $n_3 = 1.49241$ | $v_3 = 57.66$ | |
| $r_4$ (condenser lens) = −17.2660 | | | |
| $d_4 = 13.0568$ | | | |
| $r_5$ (infrared cut filter) = ∞ | | | |
| $d_5 = 0.5000$ | $n_5 = 1.51633$ | $v_5 = 64.15$ | |
| $r_6$ (infrared cut filter) = ∞ | | | |
| $d_6 = 0.3400$ | | | |
| $r_7$ (stop mask) = ∞ | | | |
| $d_7 = 0.0600$ | | | |
| $r_8$ (reimaging lens) = −2.1728 | | | |
| $d_8 = 2.9492$ | $n_8 = 1.52540$ | $v_8 = 56.25$ | |
| $r_9$ (reimaging lens) = ∞ | | | |
| $d_9 = 3.1824$ | | | |
| $r_{10}$ (glass cover) = ∞ | | | |
| $d_1 0 = 0.7000$ | $n_{10} = 1.56600$ | $v_{10}\ 64.15$ | |
| $r_{11}$ (glass cover) = ∞ | | | |
| $d_{11} = 0$ | | | |
| $r_{12}$ (photoelectric converting element array) = ∞ | | | |

Figure 22:
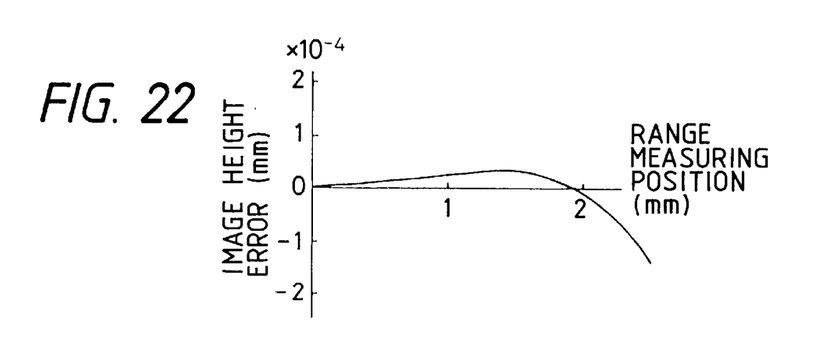
FIG. 22 is a graph showing image height errors produced in the camera of a sixth embodiment.

FIG. 22 is a graph plotting image height errors in the camera of the sixth embodiment.

In the camera of the sixth embodiment, the maximum effective areas of the imaging plane are as indicated below. The profile of the effective area of the imaging plane is the same as that of the first embodiment shown in FIG. 12.

| | |
|---|---|
| Shorter (vertical) side of the imaging plane | 16.70 mm |
| Longer (lateral) side of the imaging plane | 30.26 mm |
| Aspect ratio AR | 0.552 |

The camera of the sixth embodiment is such that the distance AB is 9.38 mm and the distance AC is 9.78 mm.

What is claimed is:

1. A camera comprising:
   a photographic lens;
   a quick-return mirror constructed and arranged to split a path of rays from said photographic lens into a photographic path and a finder path;
   an image erecting member disposed in said finder path for erecting an image;
   an eyepiece for observing the image erected by said image erecting member;
   a light receiving surface means disposed on an image surface formed in said photographic path by said photographic lens;
   a submirror joined to said quick-return mirror and arranged such that the rays coming from said photographic lens and incident on said submirror are reflected downward to form a focus detection path; and
   a focus detecting optical system disposed in the focus detection path, a preset image plane being formed in said focus detection path,
   said focus detecting optical system including:
      a condenser lens;
      a reimaging optical system for re-forming an image formed by said photographic lens on the preset image plane, the re-formed image being used for focus detection; and
      an array of photoelectric converting elements arranged to receive the re-formed image formed by said reimaging optical system;
   said light receiving surface means being constructed such that a maximum effective vertical length (X) thereof used for a photograph is determined to satisfy the condition:

$14.60 \text{ mm} \leq X \leq 17.85 \text{ mm}$ to thereby allow said camera to be small in height; and
   an aspect ratio (AR) of said light receiving surface means satisfying the condition:

$0.4 < AR < 0.63$ where the aspect ratio (AR) of said light receiving surface means is defined as $AR = X/Y$ where (Y) is a maximum effective horizontal length of said light receiving surface for a photograph.

2. The camera according to claim 1, wherein the aspect ratio (AR) of said light receiving surface means is further limited to satisfy the condition:

$0.48 < AR < 0.59$.

3. The camera according to claim 1, wherein the following condition is satisfied:

$\overline{AB} < \overline{AC}$ where (A) is a point at which a ray travelling along an optical axis of said photographic lens is incident on said submirror, (B) is a point at which the ray travelling along the optical axis of said photographic lens is incident on said light receiving surface means, and (C) is a point at which the ray along the optical axis of said photographic lens reaches the preset image plane.

4. The camera according to any one of claims 1, 2 or 3, wherein:
   an infrared cut filter is disposed in the focus detection path on a photoelectric-converting-element side of said condenser lens so that said array of the photoelectric converting elements receives rays from which infrared light components are eliminated.

5. The camera according to any one of claims 1, 2 or 3, wherein:
   said reimaging optical system comprises:
      a reimaging lens having a pair of lens elements, and
      a stop mask having a pair of apertures arranged with a space sufficient to secure an accuracy of focus detection, said stop mask being disposed adjacent to said reimaging lens.

6. The camera according to claim 4, wherein:
   said reimaging optical system comprises:
      a reimaging lens having a pair of lens elements, and
      a stop mask having a pair of apertures arranged with a space sufficient to secure an accuracy of focus detection, said stop mask being disposed adjacent to said reimaging lens.

7. The camera according to claim 5, wherein said condenser lens is constructed of material having poor electrifying properties compared with electrifying properties of said reimaging lens and said reimaging lens is constructed of material having a small hygroscopic expansion coefficient compared with a hygroscopic expansion coefficient of said condenser lens.

8. The camera according to claim 6, wherein said condenser lens is constructed of material having poor electrifying properties compared with electrifying properties of said reimaging lens and said reimaging lens is constructed of material having a small hygroscopic expansion coefficient compared with said condenser lens.

9. The camera according to any one of claims 1, 2 or 3, wherein the maximum effective vertical length (X) of said light receiving surface means is 16.7 mm.

10. The camera according to any one of claims 1, 2 or 3, wherein said condenser lens includes a single lens.

11. The camera according to any one of claims 1, 2 or 3, wherein said condenser lens includes a single double-convex lens.

12. The camera according to claim 11, wherein said both surfaces of said double-convex lens of said condenser lens are spherically shaped.

13. The camera according to any one of claims 1, 2 or 3, wherein a reflecting surface is arranged between said condenser lens and said reimaging optical system in such a manner that the focus detection path is folded back toward an object.

14. The camera according to any one of claims 1, 2 or 3, wherein said focus detecting optical system further includes a field mask, and is configured such that the preset image plane is interposed between said field mask and said condenser lens.

15. The camera according to any one of claims 1, 2 or 3, wherein said condenser lens is located on the preset image plane.

16. The camera according to any one of claims 1, 2 or 3, wherein said focus detecting optical system further includes a field mask which is located on the preset image plane.

* * * * *